April 20, 1965    G. MORESSEE ETAL    3,179,831
ROTARY ELECTRICAL MACHINE HAVING DISK TYPE ROTOR
AND LAYER OF POLYMERIZED TETRAFLUORETHYLENE
ON FIELD POLE SURFACES
Filed April 18, 1960

PRIOR ART

Inventors
GEORGES MORESSEE
ROBERT DECHET

By Pierce, Scheffler & Parker
Attorneys

United States Patent Office 3,179,831
Patented Apr. 20, 1965

3,179,831
ROTARY ELECTRICAL MACHINE HAVING DISK TYPE ROTOR AND LAYER OF POLYMERIZED TETRAFLUORETHYLENE ON FIELD POLE SURFACES
Georges Moressee, Neuilly-sur-Seine, and Robert Dechet, Boulogne-sur-Seine, France, assignors to Normacem S.A., Paris, France, a body corporate of France
Filed Apr. 18, 1960, Ser. No. 22,888
Claims priority, application France, Apr. 22, 1959, 792,814
1 Claim. (Cl. 310—268)

This invention relates generally to rotary electrical machines having planar air gaps, and more particularly to electrical machines of the planar air gap type having supporting layers of an insulating low coefficient-of-friction material which substantially completely fill the air gaps between the rotor and stator elements.

In rotary electrical machines having planar air gaps it is desirable to keep the thicknesses of both the rotor and the air gaps as small as possible so that leakage of flux passing between spaced stator elements through the rotor will be reduced to a minimum. In axial air gap machines it has been found to be advantageous to use an armature rotor disk of very thin thickness consisting of a supporting insulating layer having thin electrical conductors applied—by known printed circuitry techniques, for example—to both sides thereof.

The use of very thin rotor disks creates certain problems, however, since perfect alignment and accurate manufacture of the elements is required to obtain uniform air gaps. Due to the difficulties of mounting the rotor and due to the inherent problems arising from securing the radial electrical conductors on a thin support, warping and distortion of the rotor disks are practically unavoidable, at least during the starting period, assuming that the rotor disk will tend to straighten itself during high speed operation.

The primary object of the present invention is to prevent warping or distortion of the rotor of a machine having planar air gaps by filling the air gaps with a layer of suitable flexible insulating material having a very low coefficient of friction, such as the synthetic plastic material resulting from the polymerization of tetrafluoroethylene, commonly known as "Teflon." By filling of the air gaps with such a plastic material having a low coefficient of friction, the thin rotor disk which is inherently flexible will be supported against warping and distortion and the rotor will lightly slide on stator without adversely affecting the mechanical and electrical behavior of the flat electrical windings on the rotor or stator, and without overheating any of the relatively-movable contacting parts.

A more specific object of the invention is to provide an electrical machine having a rotor and a stator spaced by a flat air gap which is substantially filled by a layer of synthetic plastic material, said layer being secured to a face of either the rotor or the stator.

Another object of our invention is to provide an axial air gap machine having an armature disk rotor mounted between spaced stator elements, said rotor being substantially completely enclosed by a layer of plastic material secured thereto, said plastic layer having a low coefficient of friction and being in frictional engagement with the adjacent surfaces of the stator element.

Other objects and advantages of the invention will become apparent from a study of the following specification when considered in conjunction with the accompanying drawings in which.

In the drawings, the same reference numerals have been applied to identical elements in the various figures.

Figure 1:
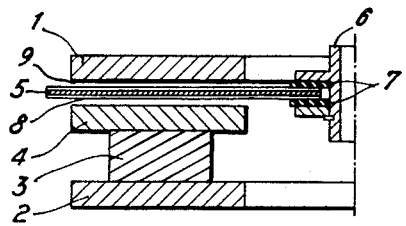
FIG. 1 is a detailed sectional view of an axial air gap machine of the prior art.

Referring now to FIG. 1, an axial air gap machine of the prior art has been illustrated having a stator including a first stationary annular magnetic yoke 1 and a second stationary ferromagnetic yoke 2 on which are mounted the permanent magnets 3. Pole shoes 4 are secured to the permanent magnets 3 generally parallel to and spaced from the soft iron annular yoke 1.

Rotatably mounted between the adjacent faces of yoke 1 and pole shoes 4 and spaced therefrom by the air gaps 8 and 9 is the armature disk 5 which is inherently flexible. This armature disk consists of an intermediate supporting layer of insulating material on the upper and lower surfaces of which radial conductors are mounted—by well-known printed circuitry techniques, for example—to form a flat electric winding. At its central portion the annular armature disk is fixedly connected to the rotary shaft 6 and is electrically insulated therefrom by the insulating washers 7. In a known manner, the magnetic flux passing from the pole shoes 4 to the yoke member 1 is cut by the electrical conductors radially arranged on the rotary armature disk 5.

Figure 2:
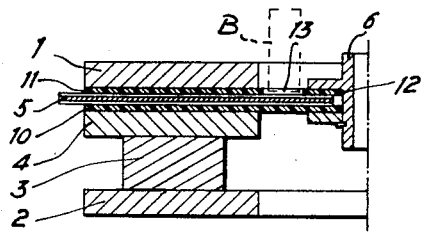
FIG. 2 is a detailed sectional view of an axial air gap machine, the air gaps of which are substantially filled with layers of a plastic material having a low coefficient of friction, one of the layers being secured to a stationary member of the machine and the other of the layers being secured to the rotor of the machine.

Referring now to FIG. 2, according to the present invention, annular layers 10 and 11 of a suitable flexible electrically-insulating non-conductive plastic material having a low coefficient of friction—such as "Teflon" (tetrafluoroethylene), for example—are provided substantially filling the air gaps between the armature disk 5 and the adjacent surfaces of the stator elements.

These Teflon layers 10, 11 may be secured to either the rotor or stator elements as desired. In the apparatus of FIG. 2, the layer 10 is secured to the under surface of the armature disk 5 by any suitable means (such as by an adhesive, for example) and extends intermediate the central portion of the disk 5 and the adjacent flange of the shaft 6 to serve as the functional equivalent of the lower insulating washer 7 of FIG. 1. The upper washer 12 could also be made of Teflon. The upper Teflon layer 11 of FIG. 2 is secured to the surface of stator yoke 1, although it could be secured to the armature disk 5 instead, if desired.

It should be noted that the upper plastic layer 11 does not extend completely radially inwardly to the central axis of the disk, but rather an annular space 13 is left providing access to the armature disk conductors for the spring-biased stationary brush B which frictionally rubs across said conductors in a known electrical manner.

It is apparent that during rotation, the upper surface of the disk 5 will frictionally lightly engage the stationary Teflon layer secured to the yoke 1, and the lower surface of Teflon layer 10 (secured to the armature disk 5) will frictionally lightly engage the upper surface of the pole shoes 4. Due to the low coefficient of friction of the Teflon layers, the frictional drag on the rotor will not be unduly great. Since the air gaps between the rotating armature disk and the stator members are substantially filled by the Teflon layers, the thin armature disks 5 will be substantially supported against warping across its entire diametric dimensions.

The magnetic flux extending from the pole shoes 4 to the yoke member 1 will readily pass through the synthetic plastic layers 10 and 11 and will be cut by the conductors on the rotary armature disk 5 in a known manner.

Figure 3:
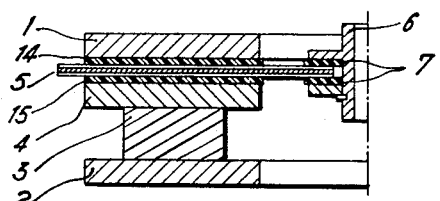
FIG. 3 is a modification of the apparatus of FIG. 2 wherein both layers are secured to stator elements of the machine on opposite sides of the rotor disk.

In the modification of FIG. 3, the annular Teflon layers 14 and 15 are secured to the stationary elements 1 and 4, respectively, so that the upper and lower surfaces of rotary armature disk 5 will lightly frictionally engage the adjacent Teflon surfaces with the result that warpage or distortion of the armature disk will be prevented in a positive manner.

Figure 4:
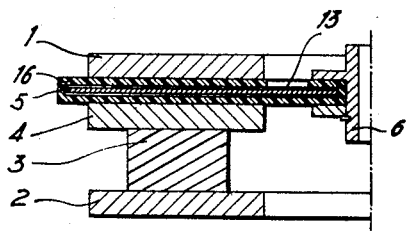
FIG. 4 is a further modification wherein the layer of plastic material is mounted upon and substantially completely encloses the rotor disk.

Referring now to the embodiment of FIG. 4, it will be seen that the annular armature disk is substantially completely enclosed by the Teflon layer 16, the annular brush access space 13 being the only portion of the disk not covered by the Teflon enclosing layer. The layer 16 is secured to the disk 5 for rotation therewith relative to the stator elements 1 and 4. The thickness of the covering layer 16 is such that the air gaps between the armature disk 5 and the stator elements 1 and 4 will be substantially filled.

It is to be noted that it is not necessary for the plastic layers to completely fill the air gaps between the rotor and stator elements since the primary purpose of the low coefficient of resistance elements is to support and prevent warping and distortion of the rotor. This function of the plastic layers is achieved even when the layers are confined only to portions of the air gaps the remainder of which consist of air as in conventional electric machines.

While in accordance with the patent statutes we have illustrated and described the best forms and embodiments of our invention now known to us, it will be apparent to those skilled in the art that other changes and modifications may be made in the apparatus described without deviating from the invention as set forth in the following claim.

We claim:

In a rotary electrical machine which comprises a stationary stator member having a pair of parallel spaced annular faces providing polar regions alternating in polarity, a rotor member comprising a relatively thin inherently flexible disk of insulating material having lamellar windings applied to the opposite faces thereof, said rotor member being mounted between said annular faces of said stator member for rotation about an axis concentric with the stator axis, the improvement constituted by a thin layer of polymerized tetrafluorethylene applied to each annular face of said stator member in spaced relation to the lamellar winding on the appertaining face of said rotor, said polymerized tetrafluorethylene layer having a low coefficient of friction to thereby establish a frictionally low and insulated sliding contact with any portion of the lamellar winding of said rotor member which may arise as a result of flexure on said rotor member.

References Cited by the Examiner
UNITED STATES PATENTS

| | | | |
|---|---|---|---|
| 473,367 | 4/92 | Short | 310—90 |
| 1,897,184 | 2/33 | Zopp | 310—268 |
| 2,251,816 | 8/41 | Arutunoff | 310—90 X |
| 2,315,917 | 4/43 | Arutunoff | 310—90 X |
| 2,773,239 | 12/56 | Parker | 324—114 X |
| 2,781,464 | 2/57 | Timms | 310—90 |
| 2,806,158 | 9/57 | Emery et al. | 310—103 |
| 2,974,284 | 3/61 | Parker | 324—150 |

MILTON O. HIRSHFIELD, *Primary Examiner.*

DAVID X. SLINEY, *Examiner.*